(12) United States Patent
Nakayama et al.

(10) Patent No.: US 7,061,526 B2
(45) Date of Patent: Jun. 13, 2006

(54) IMAGE PICKUP DEVICE WITH MULTIPLE IMAGE SENSORS WHICH COMBINES IMAGE DATA FROM MULTIPLE IMAGE SENSORS TO INCREASE RESOLUTION

(75) Inventors: Osafumi Nakayama, Kawasaki (JP); Morito Shiohara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 816 days.

(21) Appl. No.: 10/012,471

(22) Filed: Dec. 12, 2001

(65) Prior Publication Data

US 2002/0167593 A1    Nov. 14, 2002

(30) Foreign Application Priority Data

May 11, 2001    (JP)    ............... 2001-140925

(51) Int. Cl.
  *H04N 5/225*    (2006.01)
(52) U.S. Cl. .................... 348/218.1; 348/262
(58) Field of Classification Search ........... 348/262, 348/218.1
  See application file for complete search history.

(56) References Cited

U.S. PATENT DOCUMENTS 4,652,909 A * 3/1987 Glenn ................... 348/262
5,130,814 A * 7/1992 Spencer ................. 386/109
5,386,228 A * 1/1995 Okino ................. 348/218.1
5,532,737 A * 7/1996 Braun ..................... 348/36
6,198,505 B1 * 3/2001 Turner et al. .......... 348/222.1
6,373,523 B1 * 4/2002 Jang ..................... 348/273

FOREIGN PATENT DOCUMENTS

JP    9-289605    11/1997

OTHER PUBLICATIONS

English translation for JP 09-289605 Tanabe Atsushi et al.*

* cited by examiner

*Primary Examiner*—Tuan Ho
*Assistant Examiner*—James M. Hannett
(74) *Attorney, Agent, or Firm*—Westerman, Hattori Daniels & Adrian, LLP

(57) ABSTRACT

Light from an object to be picked up as condensed by a condensing lens system is made incident to be separated into two directions by a spectroscope, wherein an overall image of the object to be picked up, obtained by forming one of the separated light on a primary area pickup element through a primary image-forming lens system of an overall image pickup unit, is picked up for outputting an overall image signal. Simultaneously therewith, a part of the object to be picked up obtained by forming the other light as separated by the spectroscope on a secondary area pickup element, which is of similarly low resolution as the primary area pickup element, through a secondary image-forming lens system of a detailed image pickup unit is picked up for outputting a detailed image signal of high resolution.

11 Claims, 16 Drawing Sheets

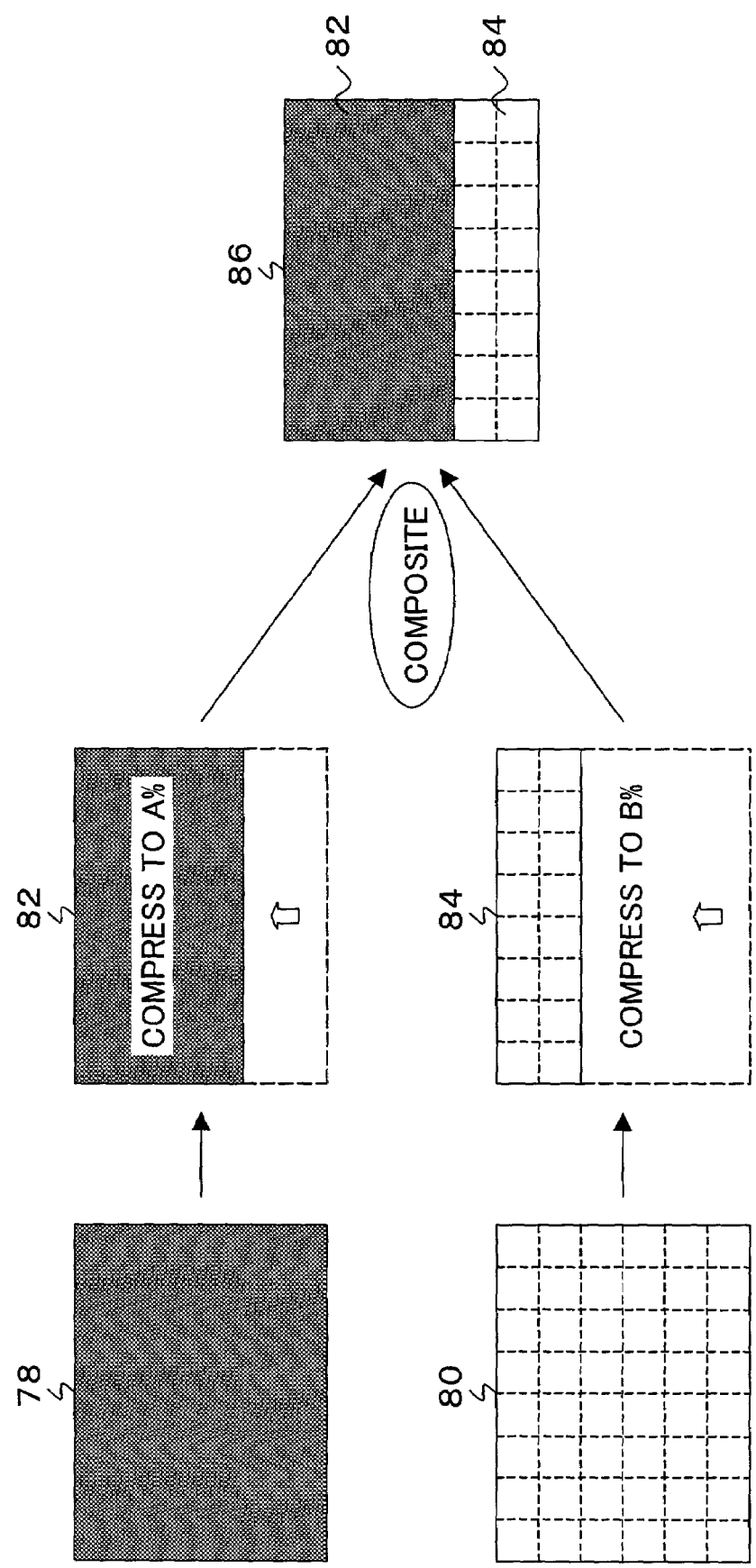

IMAGE PICKUP DEVICE WITH MULTIPLE IMAGE SENSORS WHICH COMBINES IMAGE DATA FROM MULTIPLE IMAGE SENSORS TO INCREASE RESOLUTION

BACKGROUND OF THE INVENTION

1. Field of the Invention

The present invention relates to an image pickup device for picking up an object to be picked up at a video rate and outputting an image signal, and particularly to an image pickup device for simultaneously and rapidly picking up images of low resolution of the entire object to be picked up and images of high resolution of parts of the object to be picked up.

2. Description of the Related Arts

Among conventional methods for simultaneously picking up a wide range and detailed images, there is one method employing a plurality of cameras of different zoom ratios and another method employing a camera of high resolution. In the method employing a plurality of cameras of different zoom ratios, two cameras, namely a wide-angle camera 100 and a telephoto camera 102 as illustrated in FIG. 1 are employed such that the wide-angle camera 100 acquires images of the entire objective region while for picking up detailed images, an electric universal head mounted to the telephoto camera 102 is controlled so that the telephoto camera 102 is turned to a direction of a required portion. In this manner, it is possible to obtain an overall image and desired partial telephoto (enlarged) images. In the method employing a camera of high resolution, a camera of remarkably high resolution is employed for the pickup and not only required spots but also the entire object is picked up at high resolution. There are known two methods in conventional approaches for obtaining images of high resolution, one of which is a method for realizing high resolution in that the pickup device includes elements that are minute themselves for increasing the number of elements as a whole, while another one is a piece-wise image compositing method in which images that have been picked up piece-wise by using a plurality of pickup devices are composite into a single large image. In the method of employing minute elements for the pickup device, developments have been accelerated in the field of both, CCD pickup devices as well as CMOS pickup devices in view of the spread of digital cameras in these years, and accompanying remarkable increases in the number of elements, cameras of 3 million pixels and more for consumer and industrial use are already commercially available. As for the piece-wise image compositing method, explanations will be made by referring to the pickup device as suggested by Tanabe et al. (Japanese Patent Unexamined Publication No. 9-289605 (1997)). A light ray that has been condensed by a lens of a camera is N branched by means of a branching means that is provided at a rear stage of the lens, and pickup devices such as CCDs are respectively provided for the respectively branched light rays for pickup. At this time, the respective pickup devices are disposed to receive light of mutually different parts of the original image. A group of partial images of the object can be obtained by picking up with the thus disposed devices. The obtained partial images are thereafter composited to obtain a single large image of high resolution. If branched into four, it will finally be possible to obtain an image having a high resolution equivalent to an image that has been picked up by an pickup device having a number of elements that is as four times as large as the original number.

However, the following drawbacks are presented in such a conventional device for simultaneously picking up an overall image and partial images of an object. First, in the method employing two cameras, namely the wide-angle camera 100 and the telephoto camera 102 as illustrated in FIG. 1, the provision of two cameras 100, 102 located at different positions may lead to a drawback that when controlling the telephoto camera 102 to turn to a required spot, the direction may be different depending on respective distance to object bodies 104, 106. That is, even though the object bodies 104, 106 might be located at different positions as illustrated in FIG. 1, the directions (positions) when seen from the wide-angle camera 100 side will be considered to be identical. However, the directions to which the telephoto camera 102 should turn differ depending on the distances (positions) of the object bodies 104, 106. In this manner, even though the directions to which the telescopic camera 102 should turn differ depending on the positions of the object bodies 104, 106, the distance with respect to the object bodies 104, 106 cannot be acquired by the wide-angle camera 100 alone, and it may happen that the direction to which the telephoto camera 102 should be turned is not available. This drawback is one a drawback that occurs owing to the fact that the provision of a plurality of cameras of different positions of viewpoints will inevitably result in a plurality of optical axes.

Next, drawbacks caused in the method employing a camera of high resolution will be explained. First, since the entire image will be of high resolution, an amount of information included in the image will be enormous and leads to a drawback in that image cannot be rapidly transferred. For instance, in case an image of 3 million pixels that has been obtained upon high densification of the pickup device elements is to be transferred, the amount of information will be eleven times as large as an ordinary TV image of NTSC type, and a transfer rate of NTSC signals will be 2.7 frames/second (fPS). When considering an image processing system using a personal computer as a processing device, the transfer rate of a PCI bus that is generally used in a personal computer is 133 MB/second at maximum and the rate at which an image of 3 million pixels can be taken into the computer on the provision of 1 bite/pixel, the transfer rate will be 2.3 frames/second and thus also low. As explained, it is difficult to acquire images at a video rate (30 frames/second) in the method for achieving high resolution of the entire range of pickup owing to shortage of speed for transferring images, and such a method cannot be applied to a moving image processing system that focuses on moving objects.

A second drawback is it that in case a further increase in resolution is required, it will be difficult to achieve high resolution of a desired level. It is generally the case that the resolutions required for image processing differ depending on objects to be picked up, and it may be that some pickups need to be made at extremely high resolution. However, in the method employing a pickup device of high density, the upper limit for improving the resolution will be limited by the resolution owned by the device. While it is necessary to manufacture pickup elements of even higher density for improving the resolution, minute elements result in a lesser amount of photoreceptors and thus in worsening of S/N ratio and is thus not practical. It is also a drawback in view of practicality that micromachining leads to extreme increases in costs owing to difficulties in production. It is similarly difficult to improve resolution on demand in the piece-wise image compositing method in which an image is composited of piece-wise picked up images using a plurality of pickup elements. This is due to the fact that for improving the resolution, it will be required to increase the number of dividing a single image, that is, the number of pickup devices to be used. However, in case the number of pickup devices becomes very large, it will in fact be impossible to secure spaces for disposing the pickup devices within the camera. For instance, for improving the resolution at an aspect ratio of ten times with respect to the overall image, it will be necessary to dispose 100 pickup devices which can hardly be realized.

SUMMARY OF THE INVENTION

According to the present invention, it is possible to provide an image pickup device that utilizes pickup elements of low resolution for simultaneously picking up and outputting an overall image and detailed images of high resolution by using a common optical axis.

The image pickup device of the present invention is comprised of a spectroscope for making an optical image of an object to be picked up that has been condensed by an condensing lens system incident and separating the same into two directions, an overall image pickup unit for forming one optical image as separated by the spectroscope onto an image-forming surface on which a primary image-forming lens system is disposed and picking up an overall image of the object to be picked up through a primary area pickup element and outputting an overall image signal, and a detailed image pickup unit for forming through a secondary image-forming lens system the other optical image that has been separated by the spectroscope onto an image-forming surface on which a secondary area pickup element having a resolution equivalent to that of the primary area pickup element is disposed, picking up a part of the object to be picked up of the overall image through the secondary area pickup element and outputting a detailed image signal of high resolution. In this manner, it is possible to obtain, simultaneously with picking up an overall image, partial images of high resolution at high speed (real time) of required portions of the overall image according to the present invention so that it is applicable as an image inputting device for all kinds of image processing systems with mutually contradicting conditions in which a relatively small object moves within a wide pickup area wherein it is required to continuous observe the pickup area while detailed images (information) of the object is also required in the presence of the object. Examples of such an image processing system are, for instance, a distribution management system for performing management of delivery upon reading letters written on small seals adhered to objects that are transferred on a conveyer extending over a large range or an observation system in which while observing presence/absence of an intruder into a specified area through an overall image (low resolution), detailed images of the intruder obtained as partial images of high resolution are accumulated or image-recognized for accordingly issuing suitable alarm depending on the object. It is alternatively possible to apply the same as an input device for a freeze-frame picture camera of ultrahigh resolution wherein partial images of high resolution are picked up at various positions of the overall pickup area and these images are composited for creating an image of ultrahigh resolution of the overall pickup area. Since the overall image is of low resolution while images of equivalently high resolution are obtained for the detailed images upon limiting on required portions even though the area pickup elements are of low resolution, the amount of information of image signals that are respectively output for the overall image and detailed images can be restricted so as to enable rapid transfer of images. For instance, in case pickup elements are employed with which images having a resolution equivalent to those of NTSC can be obtained, it is readily possible to perform transfer at a video rate of 30 frames/second (fPS).

The primary image-forming lens system forms an overall image of the object on the primary area pickup element upon reducing light from the spectroscope at a specified reduction scale α while the secondary image-forming lens system forms an overall image of the object upon enlarging light from the spectroscope at a specified enlarging scale β onto a position of an image-forming surface at which the secondary area pickup element is disposed, wherein a resolution ratio K of the detailed images that is to be of higher resolution with respect to the overall image is set on the basis of the reduction scale α, the enlargement scale β, and pickup sizes L1, L2 of the primary and secondary area pickup elements. The resolution ratio K of the detailed images that is to be of higher resolution with respect to the overall image is defined as $$K=(\beta/\alpha)\cdot\gamma$$

wherein γ is a size ratio of the pickup size L1 of the primary area image element to the pickup size L2 of the primary area image element (L1/L2). The resolution ratio K of the detailed images that is to be of higher resolution with respect to the overall image is defined as $$K=(\beta/\alpha)$$

in case the pickup sizes L1, L2 of the primary and secondary area pickup elements are identical (L1=L2). It is therefore possible to pick up detailed images having a resolution that is K-times higher when compared to the overall image even when employing an pickup element of relatively low resolution such as a NTSC camera as the secondary area pickup element to be used in the detailed image pickup unit which resolution is identical to that of the primary area pickup element of the overall image pickup unit. The detailed image pickup unit comprises a moving unit for moving the secondary area pickup element to an arbitrary position of the overall image which is formed on the image-forming surface. The moving unit includes a position controlling unit for moving the secondary area pickup element to a target position within the overall image as instructed from an external unit. With this arrangement, the secondary area pickup element for picking up detailed images is allowed to freely move within the area on the image-forming surface through the moving unit and it is accordingly possible to obtain images of high resolution at arbitrary positions. Upon setting a position, a locus or a speed for identifying a target position through external instructions, it is possible to perform remote pickup of detailed images. The detailed image pickup unit further includes a position controlling unit in which a plurality of secondary area pickup elements are fixedly provided on the moving unit for selecting and moving a secondary area pickup element that is closest to the target position within the overall image as instructed from an external unit. With this arrangement, moving to the target position within the overall image can be rapidly performed, and since the moving area of the moving unit is allowed to be small, downsizing of the detailed image pickup unit can be realized. The detailed image pickup unit further includes a position controlling unit for detecting a specific moving body from among the overall image signals that are output from the overall image pickup unit and for making the secondary area pickup element track and move through the moving unit. With this arrangement, detailed images of a moving body can be continuously picked up through automatic tracing targeting on the moving body within the overall image.

In another embodiment of the present invention, the device further includes a resolution selecting unit in which a plurality of groups comprised of a spectroscope and a detailed image pickup unit are disposed in a multi-staged manner such that one optical image from the spectroscope of the last stage is made incident into the overall image pickup unit wherein different resolution ratios are set with respect to the overall image such that resolutions of the detailed image signals as output from the plurality of detailed image pickup units are varied, and wherein corresponding detailed image signals of corresponding resolution from among the plurality of detailed image pickup units are selected and output upon receipt of instructions for selecting a resolution from an external unit. With this arrangement, it is possible to perform pickup through the plurality of detailed image pickup units at respectively different resolutions and to select only those detailed images having a required resolution on demand which may then be simultaneously output with the overall image that is created using a common optical axis. Here, the plurality of spectroscopes of multi-staged arrangement perform separation of incident light such that the amount of light that is made incident into the plurality of detailed image pickup units and the overall image pickup unit becomes identical. With this arrangement, S/N of the overall image and detailed images can be adjusted in view of the amount of light, and adjustments in image signals that can be obtained upon picking up with the area pickup elements can be easily performed. Moreover, the image pickup device of the present invention is further provided with an image compositing unit for compressing an overall image signal of a specified image size and compressing a detailed image signal of identical specified image size to be of an image size such that it suits the image size that has become empty through the overall image signals, and for generating a composite image signal of the specified size upon combining the compressed overall image signal and the detailed image signal for outputting the same to an external unit. With this arrangement, in case the overall images and the detailed images are not suitable for output as respectively different image signals, both are reduced and composited for compositing, for instance, two frames into one frame and outputting the same as a single image signal.

The above and other objects, features, and advantages of the present invention will become more apparent from the following detailed descriptions with reference to the drawings.

BRIEF DESCRIPTION OF THE DRAWINGS

FIG. 16 is an explanatory view of image compositing processes using the unit of FIG. 15.

DETAILED DESCRIPTION OF THE PREFERRED EMBODIMENT

Figure 1:
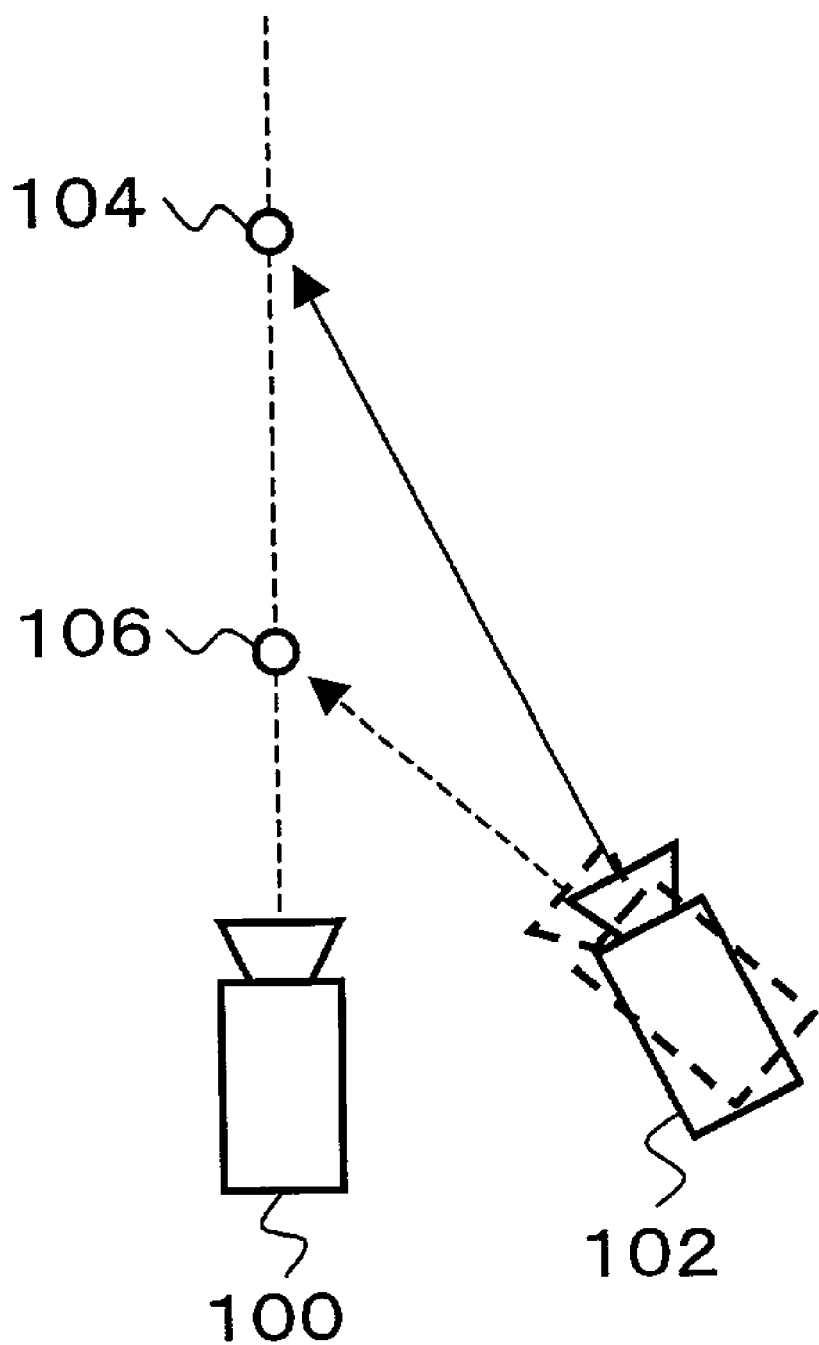
FIG. 1 is an explanatory view of a conventional device employing a wide-angle camera and a telephoto camera.
Figure 2:
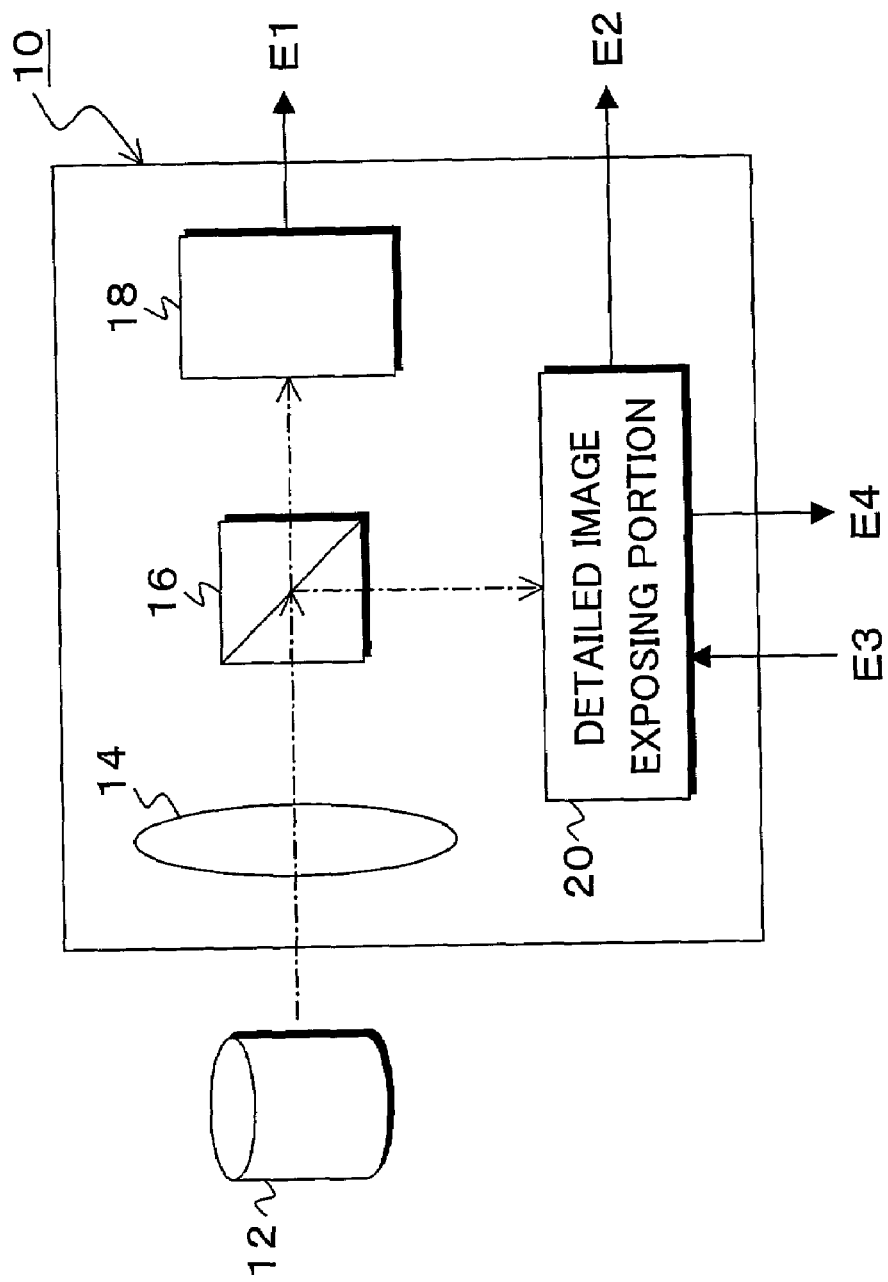
FIG. 2 is an explanatory view of one embodiment of the pickup device of the present invention.

FIG. 2 is an explanatory view illustrating one embodiment of the pickup device according to the present invention. The pickup device 10 of the present invention is arranged in that a spectroscope 16 is disposed succeeding to a condensing lens system 14 for condensing light from an object 12 to be picked up, so that an incident optical image from the condensing lens 14 is separated into two. The spectroscope 16 is an optical means such as an optical prism or a half mirror that is capable of separating incident light into two directions. In this case, the amount of light of light that has been separated by the spectroscope 16 is separated to 50% each. One of the optical images that have been separated by the spectroscope is made incident into an overall image pickup unit 18 wherein the overall image pickup unit 18 picks up an overall image of the object 12 to be picked up, for outputting an overall image signal E1. On the other hand, the other optical image that has been separated by the spectroscope 16 is made incident into a detailed image pickup unit 20. The detailed image pickup unit 20 picks up a part of the image from among the overall image and outputs a detailed image signal E2 of high resolution. The detailed image pickup unit 20 is supplied with a target position signal E3 for positioning a pickup position for a detailed image through an external unit to thereby enable pickup of the detailed image from an arbitrary position of the overall image. Positional detection of the position of the overall image for picking up the detailed image signal is performed and is output as a position detecting signal E4 to the external unit.

Figure 3:
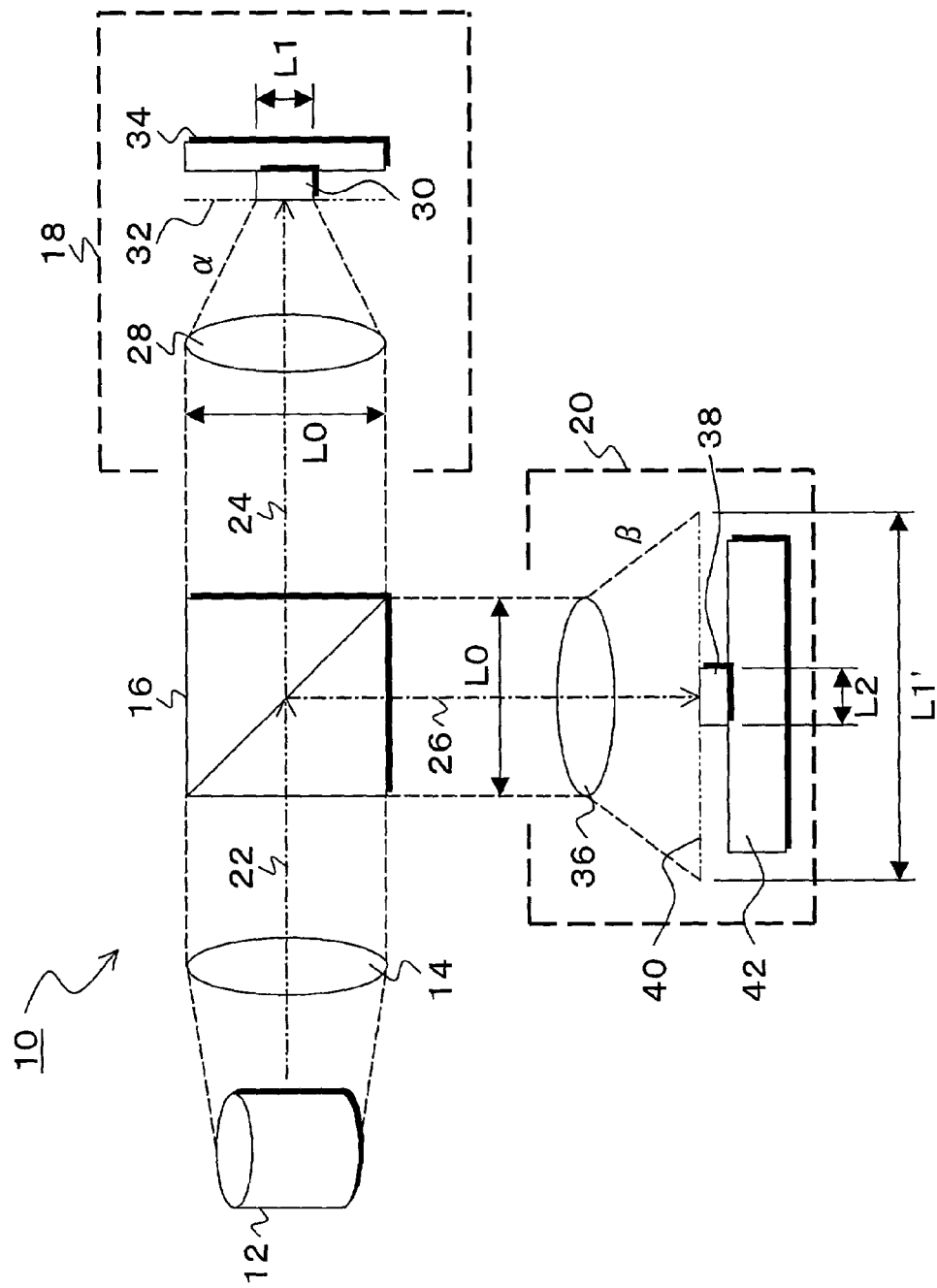
FIG. 3 is an explanatory view of one embodiment of an overall image pickup unit and a detailed image pickup unit employing area pickup elements of identical size.

FIG. 3 is an explanatory view illustrating an optical system and arrangement of the overall image pickup unit and the detailed image pickup unit of the pickup device 10 of FIG. 2 along with a condensing lens system and the spectroscope 16. The overall image pickup unit 18 for making either one light 24 that has been separated by the spectroscope 16 incident is comprised of a primary image-forming lens system 28, a primary area pickup element 30 and a mounting unit 34. The primary area pickup element 30 fixed to the mounting unit 34 may be a CCD pickup device or a CMOS pickup device of relatively low resolution as one employed in a NTSC TV camera, and the resolution is low with the resolution being approximately 512 by 512 pixels or 640 by 480 pixels. An overall image of the object 12 to be picked up, is formed on the image-forming surface 32 for the overall image that is disposed at the same position as the pickup surface of the primary area pickup element 30 by the primary image-forming lens system 28 through the one light 24 that has been separated by the spectroscope 16 wherein the primary area pickup element 30 picks up an overall image of the object 12 to be picked up, and outputs the overall image signal E1 at a video rate of e.g. 30 frames/second (fPS). The primary image-forming lens system 28 comprises a reduction lens system such that the overall image of the object 12 to be picked up, which is formed on the image-forming surface of the primary image-forming lens system 28 through the condensing lens system 14 by the use of the spectroscope 16 is reduced by a preliminarily set reduction scale α whereupon the overall image of the object 12 to be picked up, is formed on the image-forming surface 32 of the primary area pickup element 30. Here, the size of the primary area pickup element 30 in, for instance, a longitudinal direction thereof is defined as L1. On the other hand, the detailed image pickup unit 20 into which the other one light 26 that has been separated by the spectroscope 16 is made incident is comprised of a secondary image-forming lens system 36, a secondary area pickup element 38 and a moving unit 42. The secondary area pickup element 38 is identical to the primary area pickup element 30 in this embodiment. For instance, in case the primary area pickup element 30 is a CCD pickup device as one used for a NTSC camera having 512 by 512 pixels, a similar CCD pickup device of 512 by 512 pixels is employed as the secondary area pickup element 38. Due to this arrangement, size L2 of the secondary area pickup element 38 is identical to the size L1 of the primary area pickup element 38. The secondary image-forming lens system 36 comprises an enlarging lens system. More particularly, the overall image of the object 12 to be picked up, which is formed on the image-forming surface of the secondary image-forming lens system 36 through the condensing lens system 14 by the use of the spectroscope 16 is enlarged by a preliminarily set enlargement scale β whereupon the overall image of the object 12 to be picked up, is formed on the image-forming surface 40 that is coincident with the pickup surface of the secondary area pickup element 38. The secondary area pickup element 38 may be moved to an arbitrary position of the overall image that is formed on the image-forming surface 40 in an enlarged manner through the moving unit 42. It should be noted that the enlargement scale β of the secondary image-forming lens system 36 shall satisfy a relationship of β>α, wherein in case α=0.5 is, for instance, satisfied, β includes a range of 1≧β>0.5. When considering the respective image-forming sizes of the overall image pickup unit 18 and the detailed image pickup unit 20, the size of images respectively formed through the primary image-forming lens system 28 and the secondary image-forming lens system 36 by the condensing lens system 14 through the spectroscope 16 is L0 which is then reduced to size L1 at a reduction scale α to be formed as an image on the primary area pickup element 30 by the primary image-forming lens system 28. The image of size L0 of the secondary image-forming lens system 36 is enlarged at an enlargement scale β and formed as an overall image of size L1' on the image-forming surface 40 on which the secondary area pickup element 38 disposed.

Figure 4A:
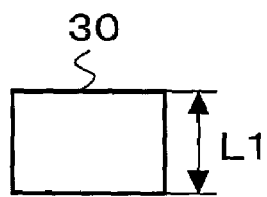
FIGS. 4(A) and 4(B) are explanatory views of a relationship between an image-forming surface and a pickup area of the overall image pickup unit and the detailed image pickup unit of FIG. 3.
Figure 4B:
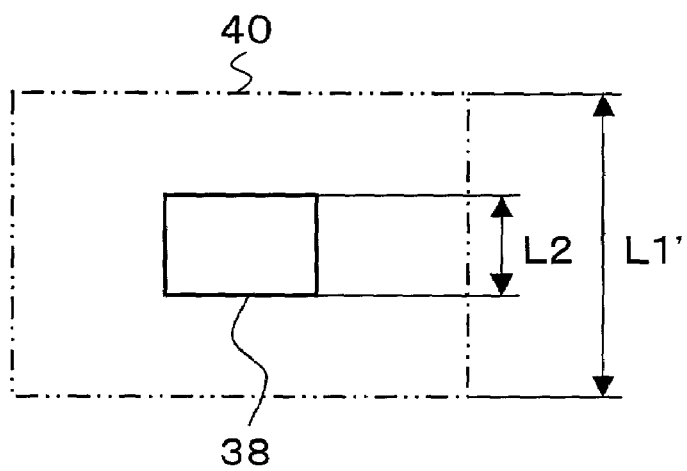

FIGS. 4(A) and 4(B) illustrate a positional relationship between overall images and elements of the primary area pickup element 30 of the overall image pickup unit 18 and the secondary area pickup element 38 of the detailed image pickup unit 20, respectively. FIG. 4(A) illustrates a pickup surface of the primary area pickup element 30, and an overall image of the object 12 to be picked up, is formed on the primary area pickup element 30 of longitudinal size L1. In contrast thereto, FIG. 4(B) illustrates an image-forming surface 40 of the detailed image pickup unit 20 on which image-forming surface 40 the enlarged overall image of the object 12 to be picked up, is formed, and the secondary area pickup element 38 is disposed therein. The longitudinal size of the secondary area pickup element 38 is defined as L2. As it is evident from FIGS. 4(A) and 4(B), the enlarged overall image is formed with respect to the secondary area pickup element 38 as an image having a size of the image-forming surface 40, and when the enlarged overall image is picked up upon this enlargement of the overall image by the secondary area pickup element 38 having a size identical to that of the primary area pickup element 30, the resolution of the secondary area pickup element 38 can be improved when compared to the primary area pickup element 30 by a ratio of enlargement of the overall image on the image-forming surface 40 to the size of the image-forming surface of the primary area pickup element 30. A ratio of resolution at which the resolution of the detailed images that are picked up by units by the secondary area pickup element 38 is intensified with respect to the overall image picked up by the primary area pickup element 30 is defined to be a resolution ratio K. The resolution ratio K will be a value for indicating by what times the resolution of the detailed images is higher than that of the overall image. The resolution ratio K is obtained as follows. The following parameters are first defined for the optical system of FIG. 3.

L0: Size of the primary lens system and overall image formed by the primary lens system L1: Size of primary area pickup element L1': Size of overall image formed on the image-forming surface of the secondary area pickup element L2: Size of secondary area pickup element α: scale of primary lens system β: scale of secondary lens system γ: size ratio of primary and secondary area pickup elements (L1/L2)

The resolution ratio K is a value in which the size L1' of the enlarged overall image on the image-forming surface 40 divided by the size L2 of the secondary area pickup element 38 of the detailed image pickup unit 20.

$$K = L1'/L2 \tag{1}$$

The size L1 of the overall image on the image-forming surface 32 of the primary area pickup element 30 of the overall image pickup unit 18 and the size L1' of the overall image on the image-forming surface 40 of the detailed image pickup unit 20 may be given by the following equations when expressed using the size L0 of the overall image formed on the primary image-forming lens system 28 and the secondary image-forming lens system 36 through the condensing lens system 14, the reduction scale α and the enlargement scale β.

$$L1 = \alpha \cdot L0 \quad (2)$$

$$L1' = \beta \cdot L0 \quad (3)$$

When expressing the size L1' of the enlarged overall image formed on the image-forming surface 40 of the detailed image pickup unit 20 by using the size L1 of the reduced overall image formed on the image-forming surface 32 of the overall image pickup unit 18, $$L0 = L1/\alpha$$

will be satisfied from equation (2), and this substituted into equation (3), $$L1' = (\beta/\alpha) \cdot L1 \quad (4)$$

will be satisfied, and by further substituting this to equation (1), $$K = (\beta/\alpha) \cdot (L1/L2) \quad (5)$$

can be obtained. Since γ=L1/L2 is satisfied as defined by the above parameters, $$K = (\beta/\alpha) \cdot \gamma \quad (6)$$

will be satisfied. Here, γ is a constant that is fixedly determined by the sizes of the primary and secondary area pickup elements 30, 38, and this equation will the general formula of resolution ratio K. Since the sizes of the primary area pickup element 30 and the secondary area pickup element 38 are set to be equal (L1=L2) in the embodiment of FIG. 3, $$\gamma = L1/L2 = 1$$

will be satisfied so that the resolution ratio K is given as $$K = (\beta/\alpha) \quad (7)$$

Thus, by arbitrarily determining the reduction scale α for the primary image-forming lens system 28 and the enlargement scale β for the secondary image-forming lens system 36 in the embodiment of FIG. 3, a suitable resolution ratio K can be simultaneously set for the partial detailed images of the secondary area pickup element 38 with respect to the required overall image of the primary area pickup element 30. In case detailed images need to be picked up at a resolution ratio K that is, for instance, 10 times that of the resolution of the overall image, an enlargement scale β of 5 is set with respect to a reduction scale α of 0.5, a resolution ratio K satisfying K=(β/α)=5/0.5=10 can be realized. In an actual device, the reduction scale α of the primary image-forming lens system 28 with respect to the primary area pickup element 30 is fixedly set while the enlargement scale β of the secondary image-forming lens system 36 with respect to the image-forming surface 40 of the secondary area pickup element 38 shall be set to an arbitrary value. In this case, for obtaining detailed images of a resolution ratio K that is not less than 1 with respect to the overall image, a relation satisfying $$\beta > \alpha$$

shall be set. In case α=β is satisfied, it is of course possible to obtain overall images of completely identical resolution from the two systems. It is further possible to employ a zoom lens system as the secondary image-forming lens system 36 such that the scale β is variable, and to vary the resolution ratio K through suitable scale setting on demand.

Figure 5:
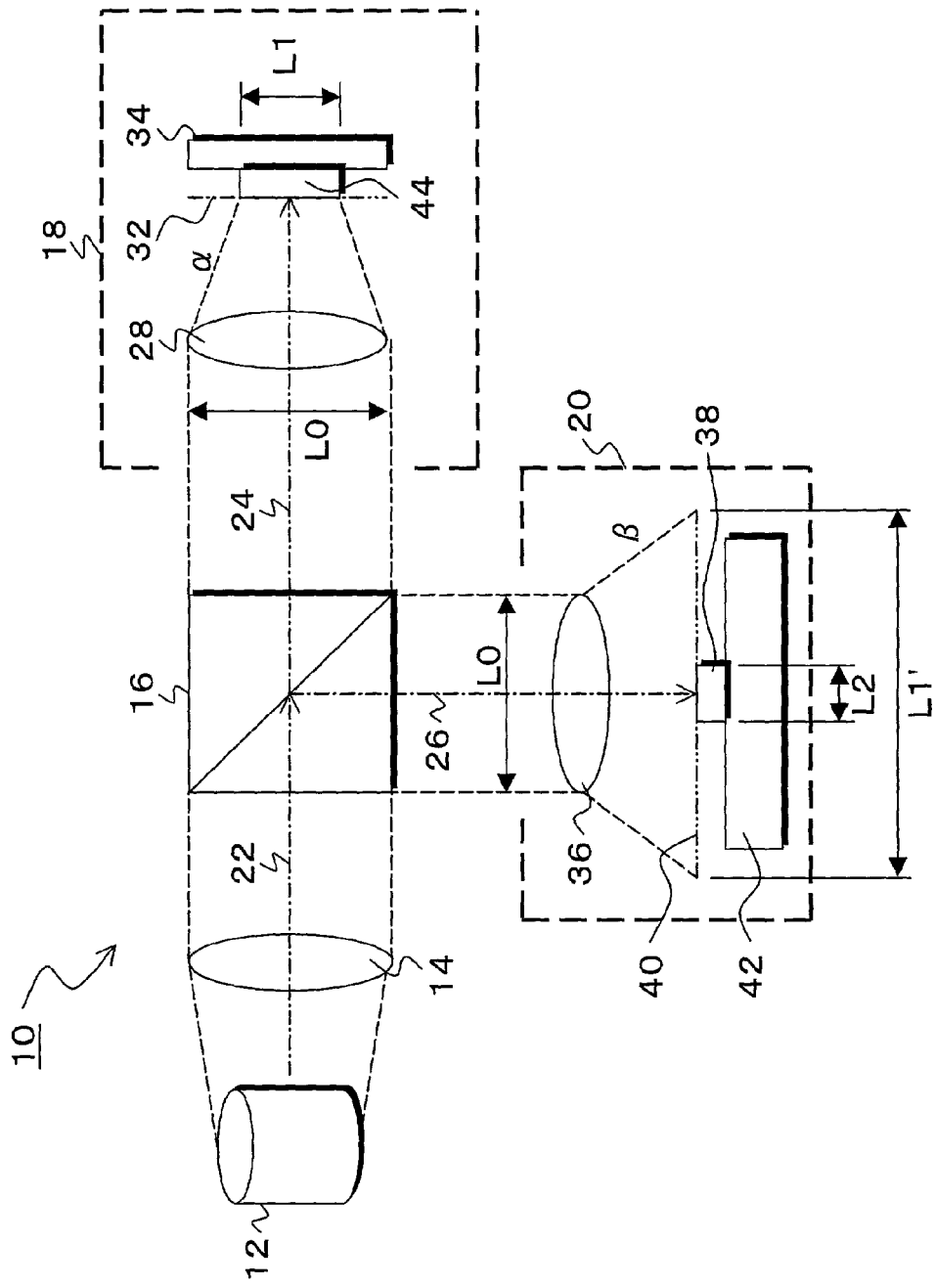
FIG. 5 is an explanatory view of another embodiment of an overall image pickup unit and a detailed image pickup unit employing area pickup elements of different size.

FIG. 5 illustrates another embodiment of the overall image pickup unit 18 and the detailed image pickup unit 20 of the pickup device of the present invention. This embodiment is characterized in that elements employed as area pickup elements for the overall image pickup unit 18 and the detailed image pickup unit 20 are of different size. The arrangements of the overall image pickup unit 18 and the detailed image pickup unit 20 that are provided to be succeeding to the condensing lens system 14 and the spectroscope 16 are basically identical to those of the embodiment of FIG. 3 while a primary area pickup element 44 provided in the overall image pickup unit 18 of this embodiment is of different size than the secondary area pickup element 38 provided in the detailed image pickup unit 20. While the secondary area pickup element 38 may exemplarily be of size L2 similar to that of the embodiment of FIG. 3, the size L1 of the primary area pickup element 44 is twice as large as that of the former. Though being of different sizes, the primary area pickup element 44 and secondary area pickup element 38 shall be of identical resolution of, for instance, 512 by 512 pixels. This is because it is of advantage to utilize the same driving circuit in case the resolutions of both elements are identical. It is of course possible to vary the resolutions for the primary area pickup element and secondary area pickup element if necessary, such that either one is of, for example, 512 by 512 pixels and the other one of 640 by 480 pixels.

Figure 6A:
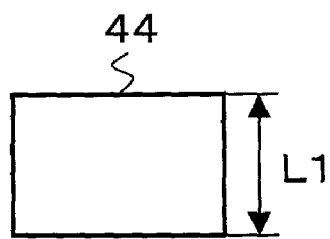
FIGS. 6(A) and 6(B) are explanatory views of a relationship between an image-forming surface and a pickup area of the overall image pickup unit and the detailed image pickup unit of FIG. 5.
Figure 6B:
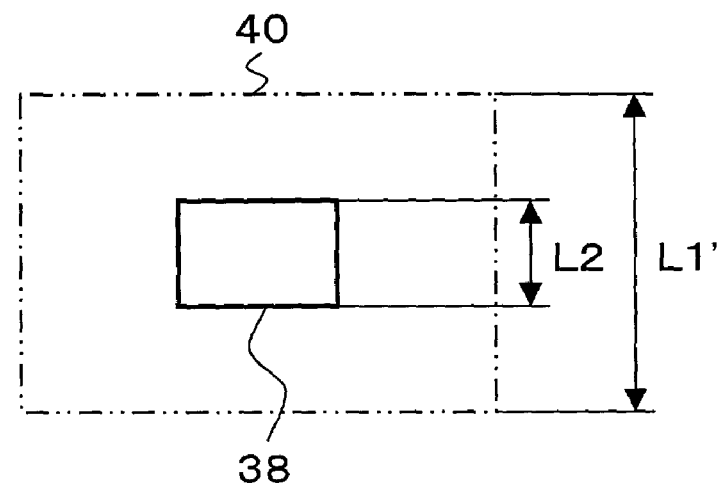

FIGS. 6(A) and 6(B) illustrate a relationship between the size, elements and pickup surfaces of the image-forming surface for the overall image of the primary area pickup element 44 and the secondary area pickup element 38 of FIG. 5 that are of different size, these being identical to FIGS. 4(A) and 4(B) except for the point that the sizes of the elements differ from each other. In case the sizes L1, L2 of the primary area pickup element 44 and secondary area pickup element 38 differ from each other as in the embodiment of FIG. 5, the resolution ratio K is determined in accordance with equation (5) or equation (6). Since the sizes L1, L2 of the pickup device are fixed, γ is determined as a fixed constant so that it is finally possible to obtain the resolution ratio K from equation (6) which is the general form.

Figure 7:
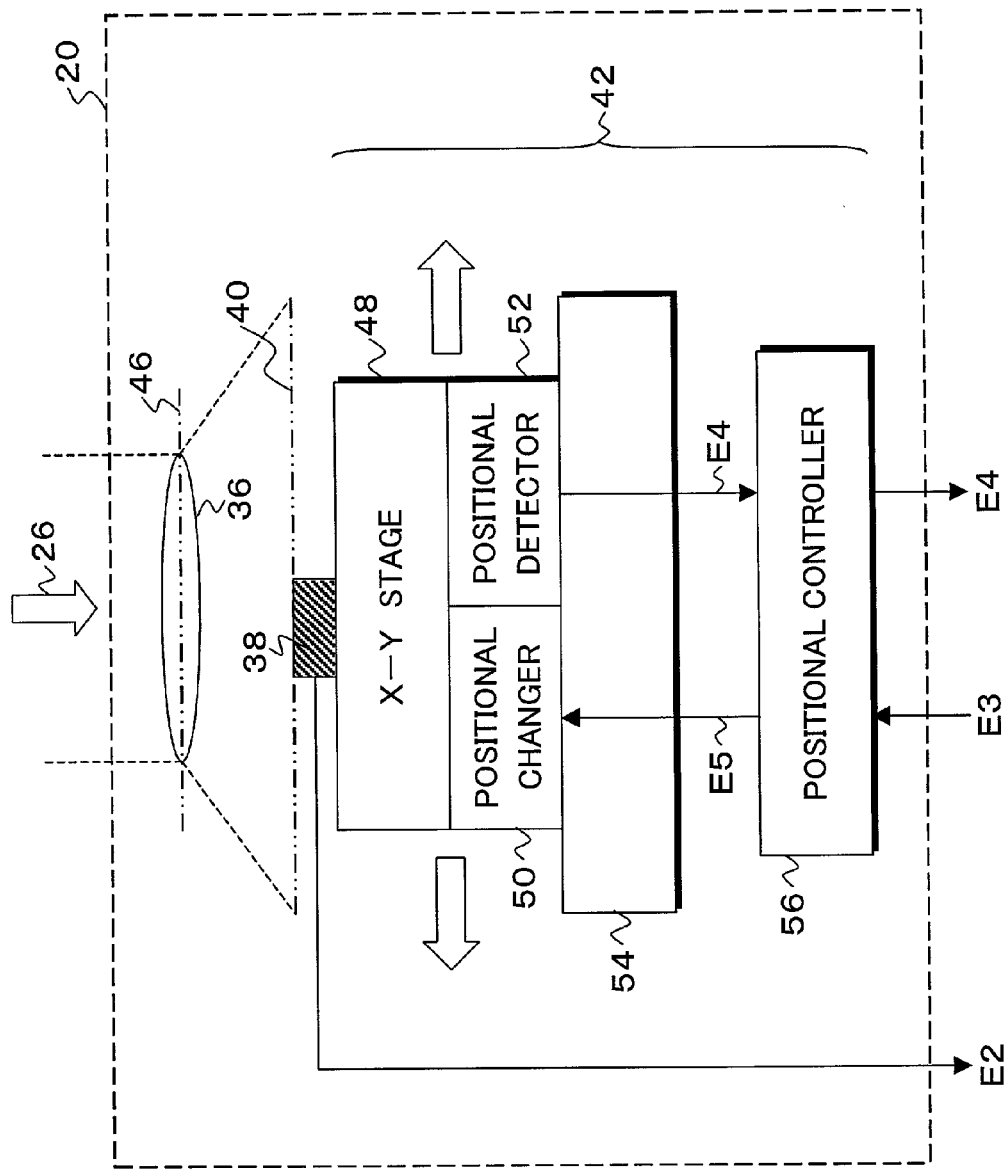
FIG. 7 is an explanatory view of one embodiment of a moving unit provided in the detailed image pickup unit.

FIG. 7 is an embodiment of the moving unit 42 provided in the detailed image pickup unit 20 according to the embodiments as illustrated in FIGS. 3 and 5. The moving unit 42 is provided with a X-Y stage 48 onto which X-Y stage 48 the secondary area pickup element 38 is fixed, wherein the secondary area pickup element 38 is made movable in horizontal directions along the image-forming surface 40 within the range of the image-forming surface 40 by means of a positional changer 50 provided with a motor and a gear train. The position of the secondary area pickup element 38 that is moved onto the image-forming surface 40 through the X-Y stage 48 is detected by a positional detector 52. The positional detector 52 may be an encoder or similar for respectively detecting movements in X-directions and Y-directions of the X-Y stage 48. The X-Y stage 48 is disposed on a mounting unit 54 through the positional changer 50. The moving unit 42 is further provided with a position controlling unit 56. The position controlling unit 56 is supplied with target position signals E3 from an external unit for moving the secondary area pickup element 38 to an arbitrary position of the overall image for picking up partial overall images. Upon receipt of the target position signal E3, the position controlling unit 56 inputs a position signal E4 from the positional detector 52 for indicating a current position of the secondary area pickup element 38 with respect to the overall image, outputs a position controlling signal E5 for servo control for eliminating deviation of the detected position signal E4 from the target position signal E3 to the positional changer 50, and more particularly to a X-driving motor and a Y-driving motor of the X-Y stage 48, and performs positioning control of the secondary area pickup element 38 at the target position of the overall image as instructed by the target position signal E3. The position detecting signal E4 of the secondary area pickup element 38 at the time the position controlling unit 56 performs position control to the target position is output to the external unit device that has instructed the target position so as to enable monitoring of the actual positioning condition within the overall image. The target position signal E3 that is instructed to the position controlling unit 56 from the external unit may be a signal including, besides positional information of particular portions within the picked up overall image, positional signals tracking a determined locus within the overall image or a signal including speeds when tracking the locus. It is exemplarily possible to employ the pickup device 10 of the present invention for picking up a belt conveyer extending over a large area as an overall image and performing positioning such that letters written on small seals adhered to objects that are transferred on the belt conveyer can be read as detailed images so that the detailed images can be simultaneously obtained with the overall image.

Figure 8:
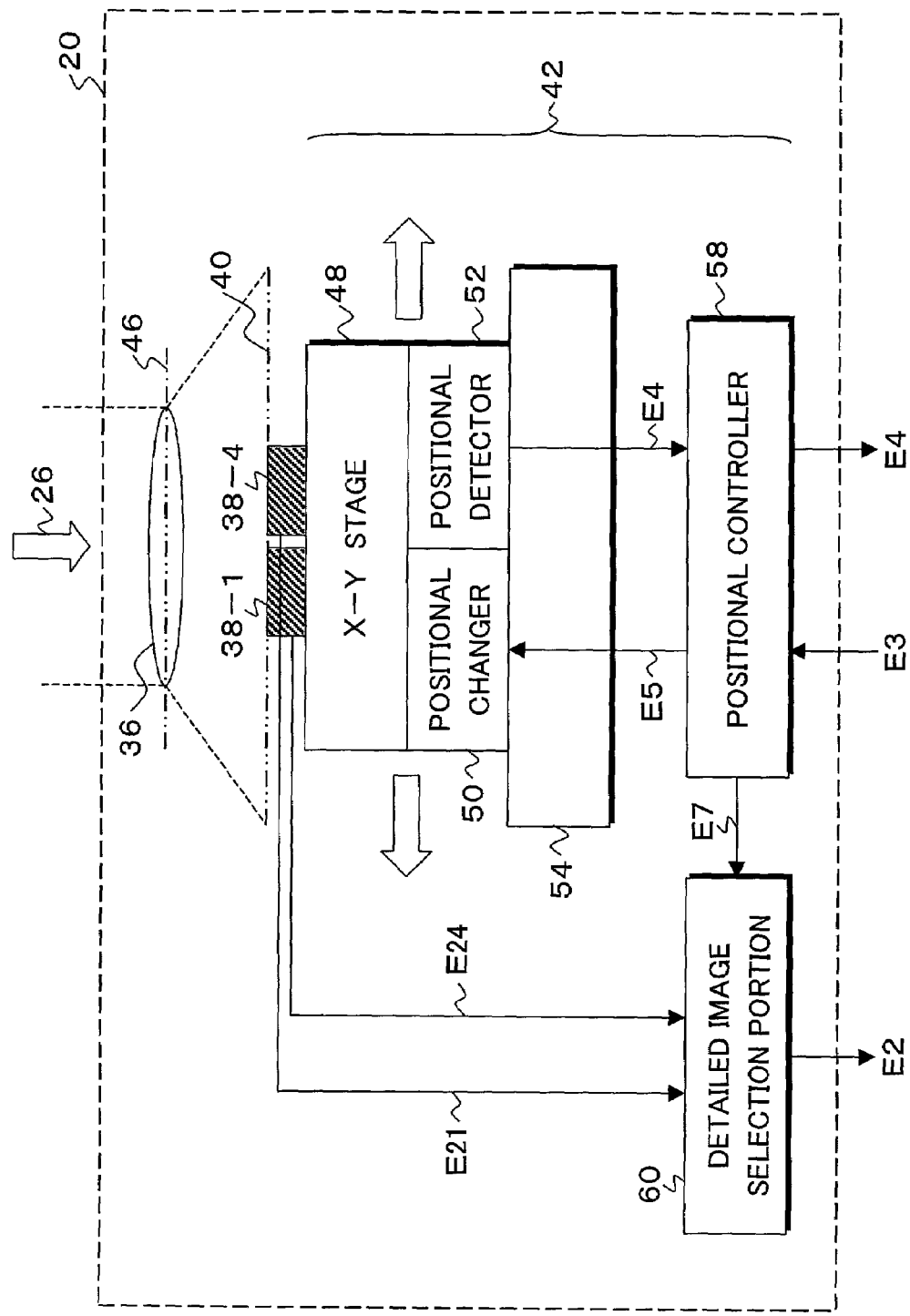
FIG. 8 is an explanatory view of another embodiment of a detailed image pickup unit with a plurality of area pickup elements being disposed at the moving unit.
Figure 9:
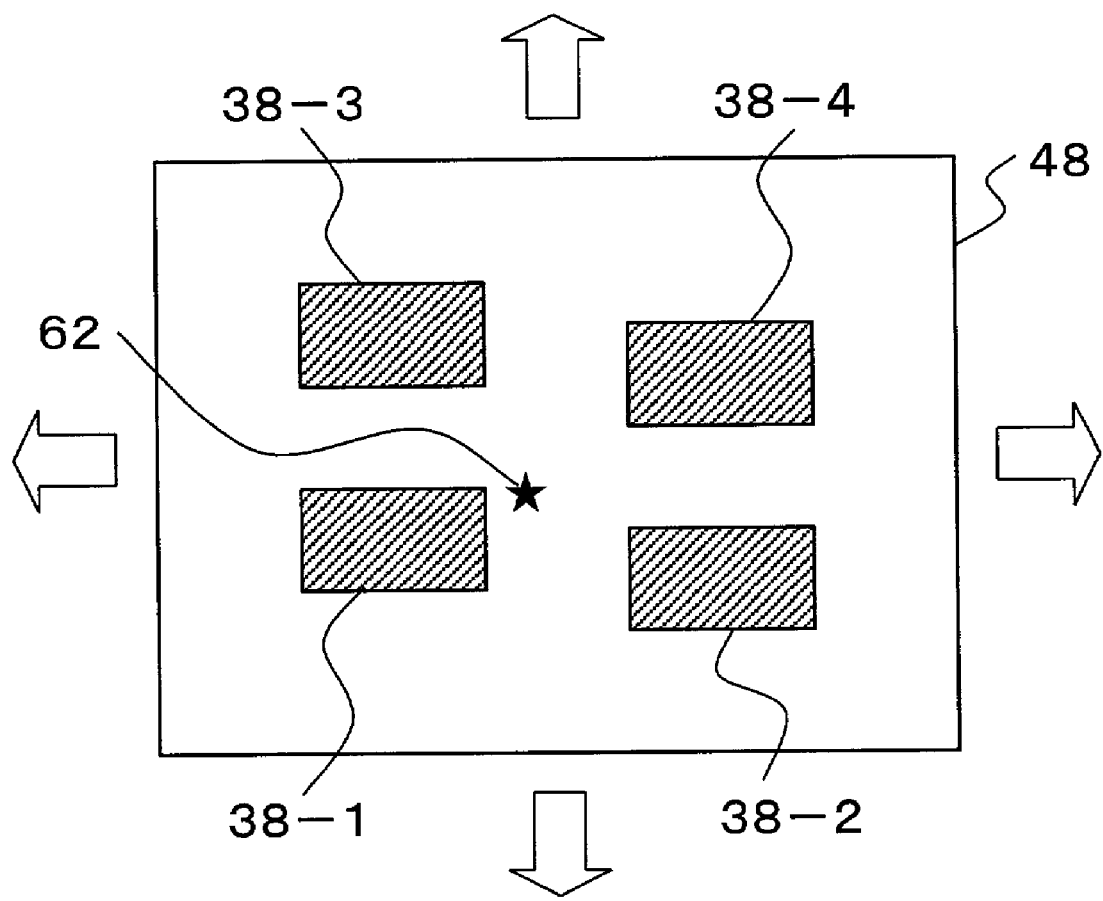
FIG. 9 is an explanatory view in which a plurality of area pickup elements is disposed on an X-Y stage.

FIG. 8 is another embodiment of the moving unit 42 provided in the detailed image pickup unit 20 of the pickup device 10 of the present invention, the embodiment being characterized in that a plurality of secondary area pickup elements for picking up partial detailed images are provided. In this embodiment, the image-forming surface 40 with an image of the image-forming surface 46 of the secondary image-forming lens system 36 of the detailed image pickup unit 20 being formed thereon in enlarged form is provided with, for instance, four secondary image-forming elements 38-1 to 38-4 as illustrated in FIG. 9 disposed on the X-Y stage 48 of the moving unit 42. The X-Y stage 48 is moveable to an arbitrary position of the image-forming surface 40 through the positional changer 50 and the position to move to is output by the positional detector 52 as position detecting signal E4. The four secondary area pickup elements 38-1 to 38-4 are driven in parallel with each other at a video rate and detailed image signals E21 to E24 that are respectively output in parallel with each other are input into a detailed image selecting unit 60. The positional changer 50 receives the position controlling signal E4 from the position controlling unit 58, and actuates the X-Y stage 48 for performing positional control of either one of the four secondary area pickup elements 38-1 to 38-4 to the target position. In the method for performing positional control through the position controlling unit 58, controlling steps are performed for moving a secondary area pickup element that is closest to the instructed target position at the time the target position signal E4 is issued to the target position. For instance, suppose that target position 62 has been instructed through the target position signal E3 with the secondary area pickup elements 38-1 to 38-4 being located at the current positions on the X-Y stage 48 of FIG. 9. The secondary area pickup element 38-1 that is located closest to the target position 62 is first selected. Positional control is then performed to move the secondary area pickup element 38-1 that is located closest to the instructed target position 62. The position controlling unit 58 simultaneously outputs a detailed image selecting signal E7 to the detailed image selecting unit 60 based on the result of selection of the secondary area pickup element 38-1 that is located closest to the target position 62. In this manner, it is possible to select a detailed image signal E21 from the secondary area pickup element 38-1 that is to be moved to the target position 62 and to output the same as a detailed image signal E2 to the external unit. By disposing a plurality of area pickup elements on the X-Y stage 48 in this manner, a secondary area pickup element that is closest may be moved to a target position upon instructions from the external unit related to a target position within the overall image that is formed on the image-forming surface 40, and it is accordingly possible to shift to a pickup condition of the detailed image of the target position within a short time. By increasing the number of secondary area pickup elements, areas in which the respective pickup elements need to move can be narrowed so that the moving area for the positional changer 50 on the X-Y stage 48 can be consequently narrowed which, in turn, allows to reduce the space of the X-Y stage 48 occupying in the device to achieve downsizing of the moving unit 42 itself in addition to downsizing of the overall pickup device 10 as well.

Figure 10:
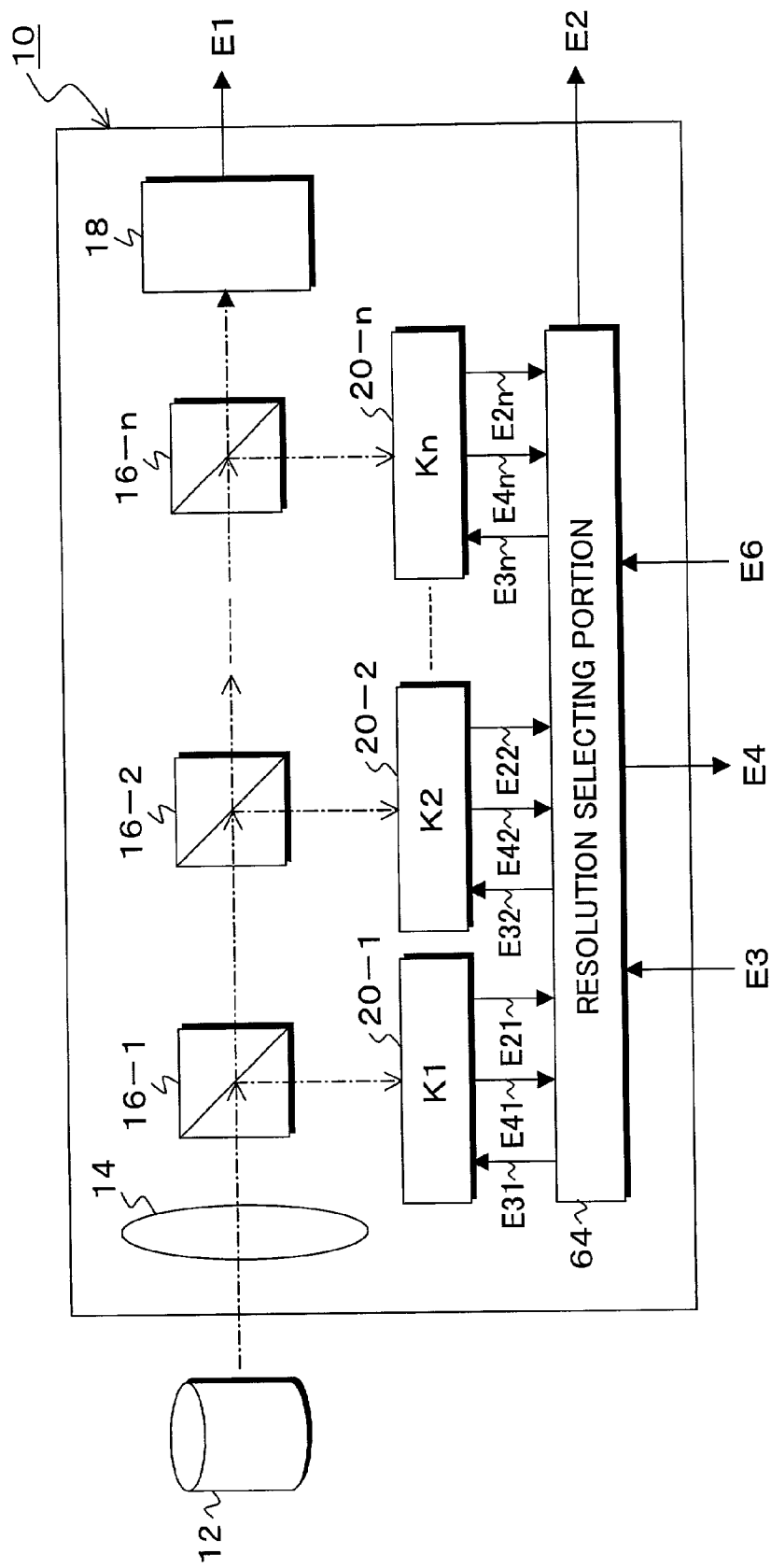
FIG. 10 is an explanatory view of another embodiment of the present invention in which spectroscopes and detailed image pickup units are arranged in a multi-staged manner.

FIG. 10 illustrates another embodiment of the pickup device 10 of the present invention, wherein this embodiment is characterized in that a plurality of spectroscopes and detailed image pickup units are arranged in a multi-staged manner with different resolution ratios being set for the plurality of detailed image pickup units such that detailed image signals of arbitrary resolutions may be obtained on demand. In succession to the condensing lens system 14 for condensing light from the object 12 to be picked up, n-number of spectroscopes 16-1, 16-2, . . . 16-n are disposed on the optical axis thereof such that one of the optical images as separated by the spectroscope 16-n of the last stage is made incident into the overall image pickup unit 18 for outputting an overall image signal E1 upon picking up the overall image. The other optical images separated by the respective spectroscopes 16-1 to 16-n are respectively made incident into the detailed image pickup units 20-1, 20-2, . . . 20-n, wherein resolution ratios K1, K2, . . . Kn are set for the detailed image pickup units 20-1 to 20-n for achieving different intensities for the resolutions with respect to the overall image that is picked up by the overall image pickup unit 18. In case of single arrangement, the detailed image pickup units 20-1 to 20-n may be identical to those of the embodiments as illustrated in any one of FIGS. 3, 5, 7 and 8. A resolution selecting unit 64 is provided for the detailed image pickup units 20-1 to 20-n. The resolution selecting unit 64 selects a detailed image pickup unit having an arbitrary resolution through the resolution selecting signal E6 from an external unit, provides the selected detailed image pickup unit with a target position signal E3 from the external unit, and takes out the position detecting signal E4 from the detailed image pickup unit to output the same to the external unit. A detailed image signal selected from the detailed image pickup units 20-1 to 20-n is further taken in to be output to the external unit as detailed image signal E2. For this purpose, signal cables between the detailed image pickup units 20-1 to 20-n and the resolution selecting unit 64 are respectively connected for the target position signals E31 to E3*n*, position detecting signals E41 to E4*n* and detailed image signals E21 to E2*n*. As for the separation of the condensed image through the spectroscopes 16-1 to 16-n in the pickup device 10 of multi-staged arrangement, it is desirable that separation is performed such that the respective amounts of separated light that are made incident into the overall image pickup unit 18 and n-numbers of detailed image pickup units 20-1 to 20-n are identical. More particularly, in case the number of spectroscopes is "n", the amount of separated light for the detailed image pickup units shall be set to 1−(n+1). For instance, in case the device is of two-staged arrangement in which n=2 comes true, ⅓ of the initial amount of incident light shall be separated to the detailed image pickup unit at the first stage while the remaining ⅔ is transmitted, and ½ is separated to the detailed image pickup unit at the second stage while the remaining ½ is transmitted to make the same incident into the overall image pickup unit 18 so as to set the entire amount of separated light to ⅓ of the amount of incident light. Expressing this in percentages, the amount of separated light to the detailed image pickup unit of the first stage is 33.3% while the amount of transmission to the next stage is 66.6% whereas the amount of separated light for the detailed image pickup unit of the second stage and the overall image pickup unit are 50% each. While the number of stages that is defined by the number of detailed image pickup units is set to be an arbitrary number "n" in the embodiment as illustrated in FIG. 10, it is desirable to employ a two-staged arrangement or a three-staged arrangement in practice since the more the number of stages increases, the more the amount of light will be reduced owing to separation.

Figure 11:
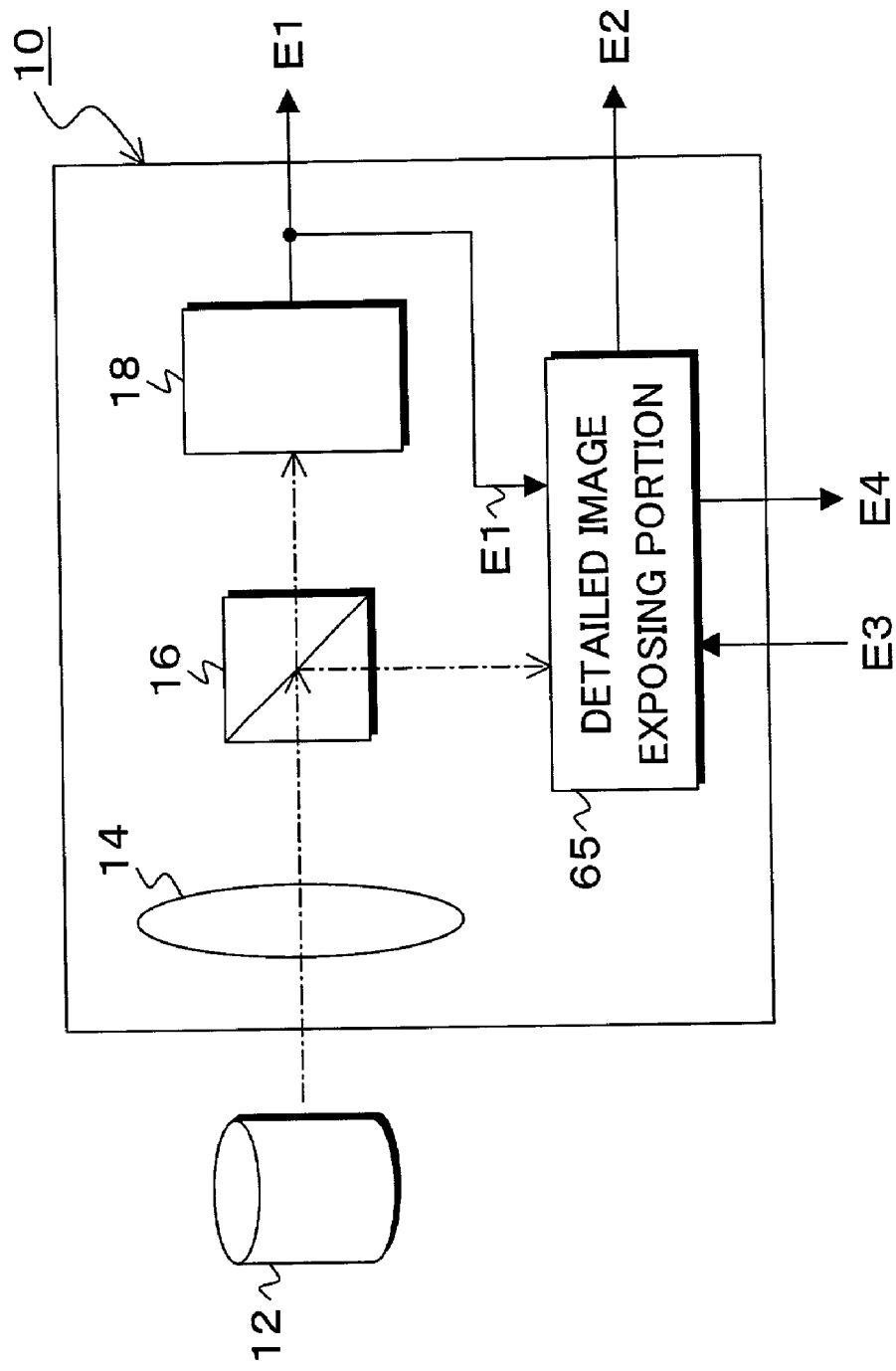
FIG. 11 is an explanatory view of another embodiment of the present invention in which overall image signals are utilized for controlling movements of area pickup elements of a detailed image pickup unit.

FIG. 11 illustrates another embodiment of the pickup device according to the present invention, wherein this embodiment is characterized in that positional control is performed for the detailed image pickup unit for picking up detailed images utilizing the overall image as picked up by the overall image pickup unit. The pickup device 10 is comprised of the condensing lens system 14, the spectroscope 16, the overall image pickup unit 18 and a detailed image pickup unit 65. The overall image pickup unit 18 is identical to those of the embodiments of FIG. 3 or 5, and picks up an overall image of the object 12 to be picked up, for outputting an overall image signal E1. In this embodiment, the overall image signal E1 resulting from a pickup by the overall image pickup unit 18 is input into the detailed image pickup unit 65 and positional control for picking up detailed images is performed by utilizing the overall image.

Figure 12:
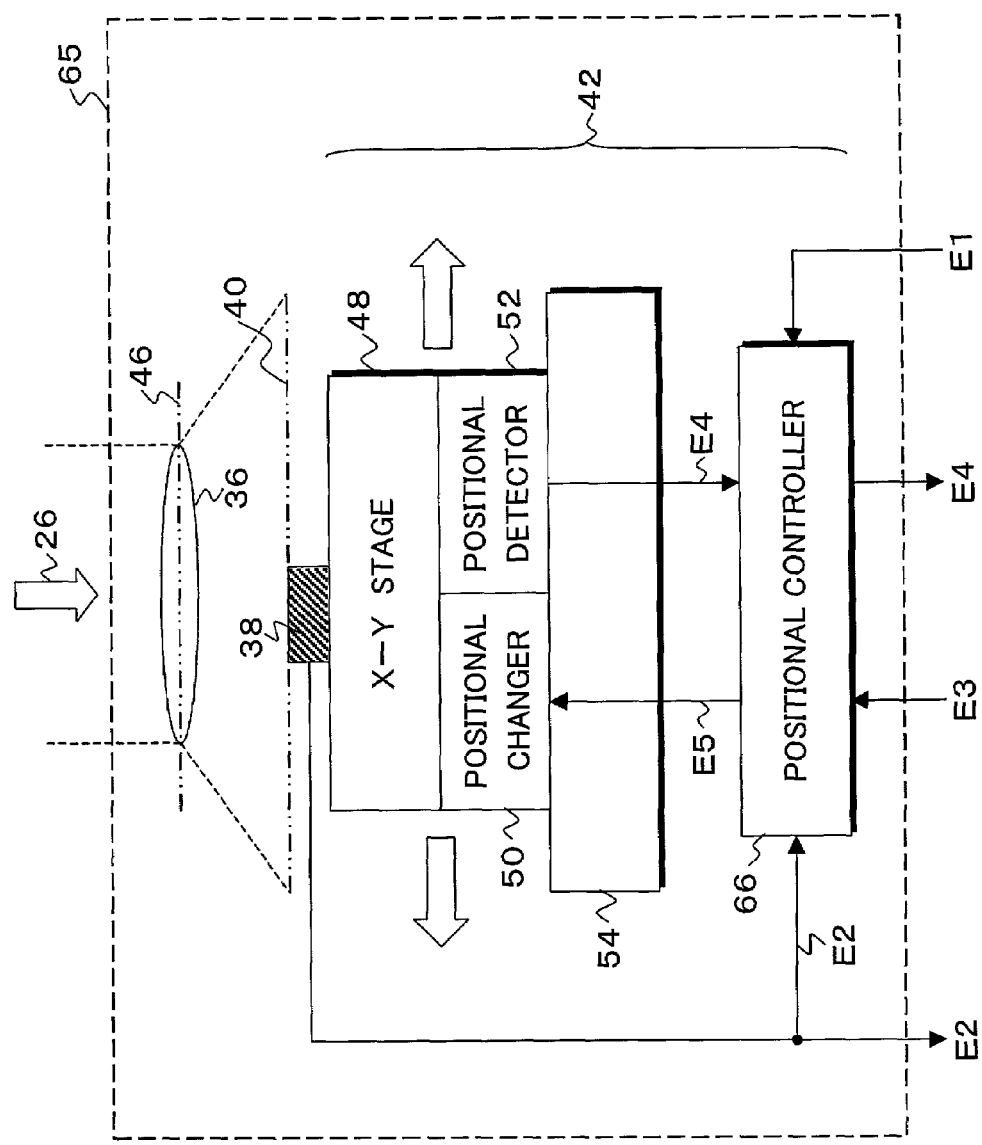
FIG. 12 is an explanatory view of an embodiment of the detailed image pickup unit of FIG. 11.

FIG. 12 illustrates details of the detailed image pickup unit 65 of FIG. 11. The detailed image pickup unit 65 is provided with a secondary image-forming lens system 36 and a secondary area pickup element 38 wherein the secondary area pickup element 38 is movable through the moving unit 42 to an arbitrary position of the overall image that is formed on the image-forming surface 40 in enlarged form. The moving unit 42 is comprised of the X-Y stage 48, the positional changer 50, the positional detector 52 and the mounting unit 54, similar to the embodiment of FIG. 7. The moving unit 42 is provided with a position controlling unit 66 wherein the position controlling unit 66 is input with overall image signals E1 from the overall image pickup unit 18 of FIG. 11 and with partial detailed image signals E2 from the secondary area pickup element 38 in addition to the target position signal E3 from an external unit. It should be noted that position detecting signals E4 from the positional detector 52 are directly output to the external unit. The position controlling unit 66 performs position control in that it detects a position and a moving speed of an object moving within a fixed scene of the overall image obtained through the overall image signal E1, outputs a position controlling signal E5 that has been calculated on the basis of the amount of movement and the current detected position thereof to the positional changer 50, and drives the X-Y stage 48 for making the secondary area pickup element 38 track the object moving within the overall image formed on the image-forming surface 40. In this manner, an object moving within the overall image is continuously captured such that detailed image signals E2 indicative of detailed images of the moving object may be output to the external unit. Detection of the object moving within the overall image can be performed through methods such as utilizing frame differences of the overall image. The embodiment as illustrated in FIG. 12 may thus be suitably used in an observation system in which presence/absence of intruders into an observed region such as a building is being observed through the overall image of low resolution while a position of an intruder moving within the overall image is traced for acquiring detailed images of high resolution to be accumulated or image-recognized and accordingly issuing alarm to the intruder.

Figure 13:
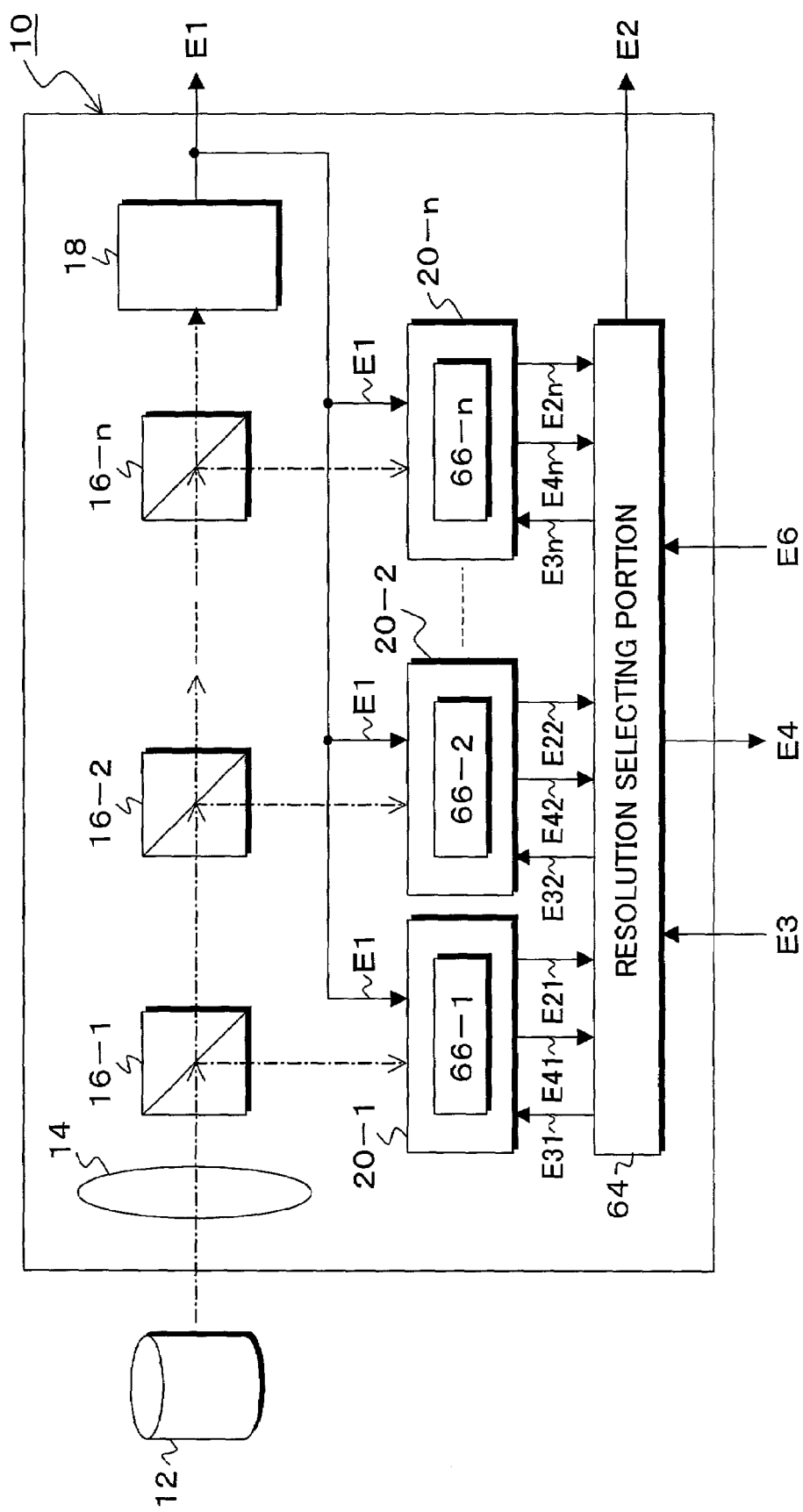
FIG. 13 is an explanatory view of another embodiment of the present invention in which overall image signals are utilized for controlling movements of area pickup elements of detailed image pickup units that are arranged in a multi-staged manner.

FIG. 13 illustrates another embodiment in which the single arrangements of FIGS. 11 and 12 are arranged as multi-staged arrangements, similar to the embodiment of FIG. 10. Also in the pickup device 10 of multi-staged arrangement, the detailed image pickup units 20-1 to 20-n are respectively provided with respective position controlling units 66-1 to 66-n for performing tracking control upon detecting a position and a speed of an object moving within the overall image as illustrated in FIG. 12. The remaining arrangement is identical to that of the embodiment of FIG. 10. In the pickup device 10 of multi-staged arrangement, one of the detailed image pickup units 20-1 to 20-n is selected that corresponds to an arbitrary resolution based on the resolution selecting signal E6 from an external unit and the moving object is detected through the position controlling unit of the detailed image pickup unit that has been selected in accordance with the overall image signal that is obtained from the overall image signal for tracking the same to obtain detailed images of the moving object in a continuous manner.

Figure 14:
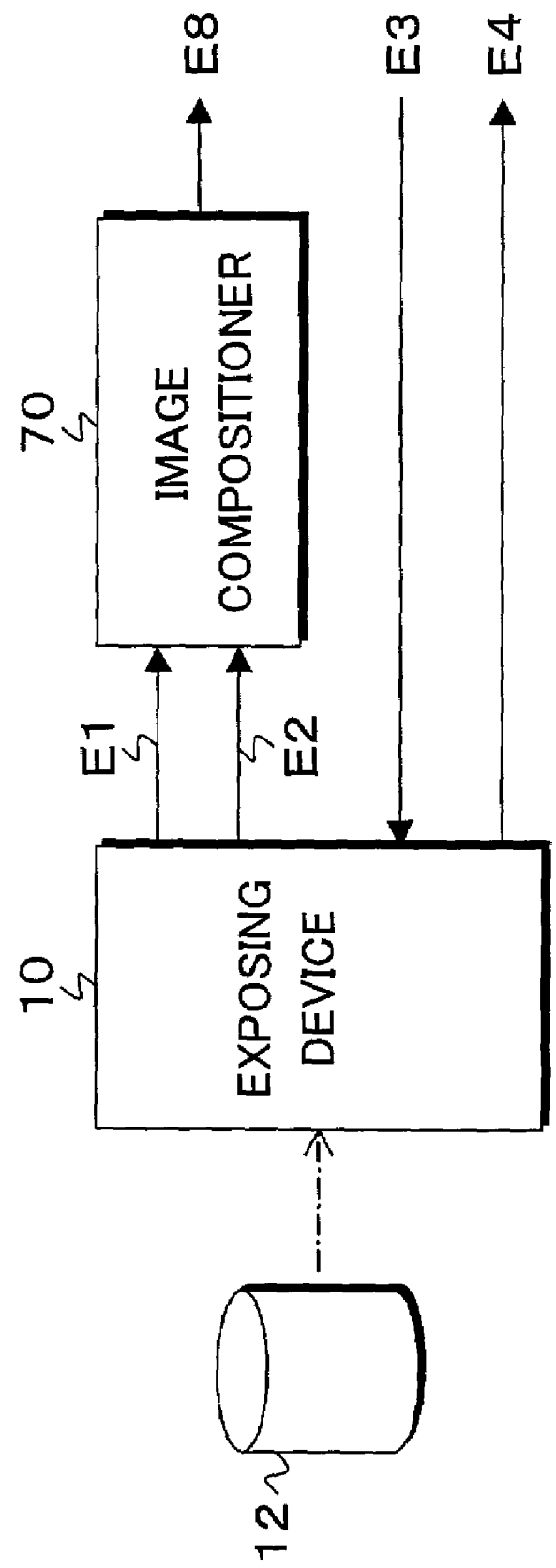
FIG. 14 is a block view of an embodiment in which overall image signals and detailed image signals as output from a pickup device are composited for output.

FIG. 14 illustrates an embodiment in which the overall image signal E1 and the detailed image signal E2 that are output from the pickup device 10 of the present invention as illustrated in the embodiments of FIGS. 2 to 13 are composited into a single image signal for output. The overall image signal E1 and the detailed image signal E2 from the pickup device 10 obtained by picking up the object 12 to be picked up, are input into an image compositing means 70 in which the two image signals are composited and are output as a single composite image signal E8 to an external unit. The pickup device 10 is input with a target position signal E3 from the external unit which, in turn, outputs a position detecting signal E4 to the external unit.

Figure 15:
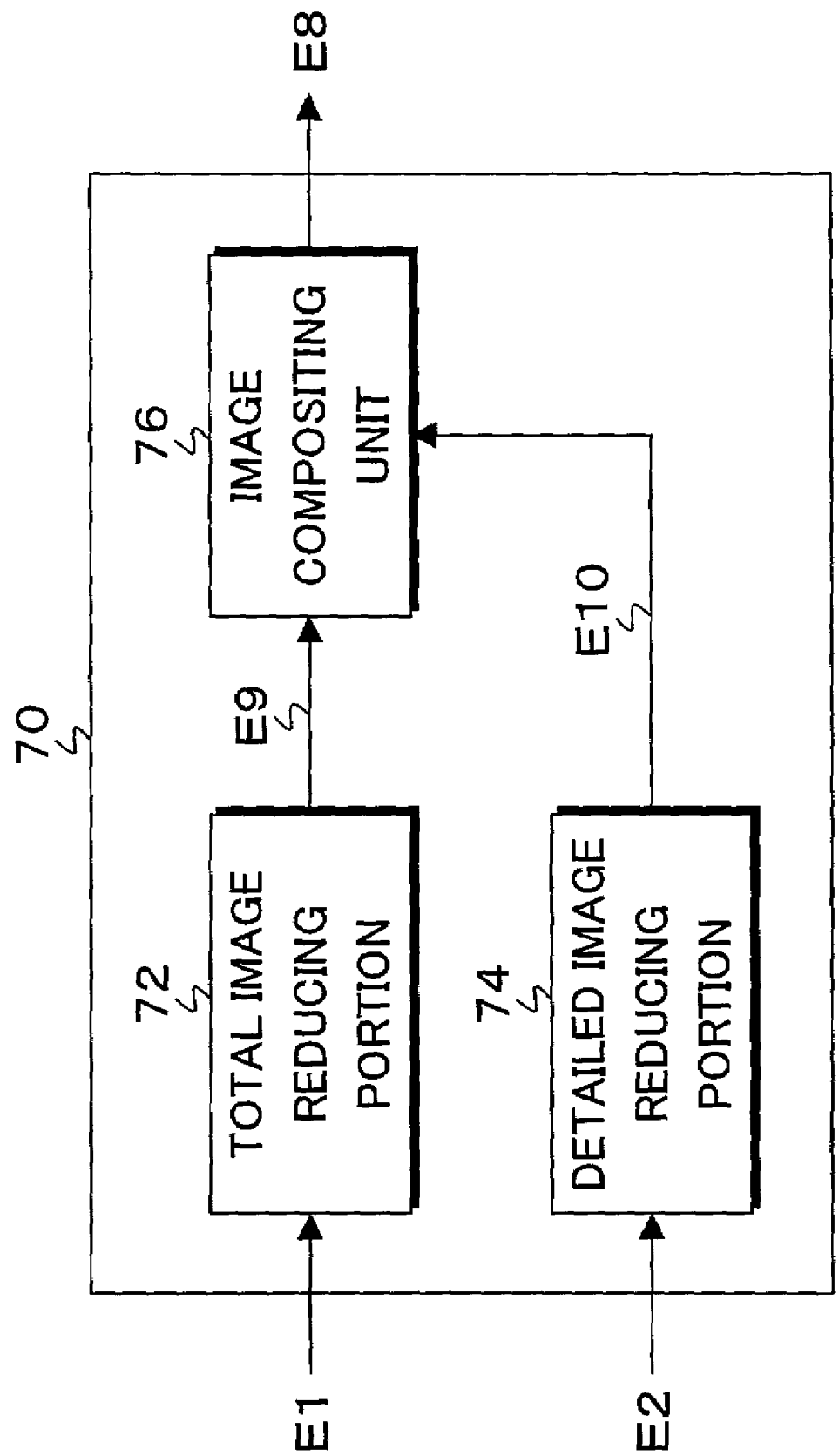
FIG. 15 is a block view of an image compositing unit of FIG. 14.

FIG. 15 is a block diagram of the image compositing means 70 of FIG. 14. The image compositing means 70 is comprised of an overall image reducing unit 72, a detailed image reducing unit 74 and an image compositing unit 76. Processes performed in the image compositing means 70 will now be explained with reference to FIG. 16. Upon input of the overall image signal E1 into the overall image reducing unit 72, an overall image 78 is exemplarily obtained while a detailed image 80 is simultaneously obtained through the detailed image signal E2 that is input into the detailed image reducing unit 74. In case a single amount of image is defined as 100%, this 100% of amount of image information is divided at arbitrary ratios to set a ratio of division for the overall image 78 to A % while a ratio of division for the detailed image 80 is set to B %. Of course, A %+B %=100% is satisfied. Based on such ratios of division for the amount of image information, the overall image reducing unit 70 compresses the overall image 78 by A % as set to obtain an overall reduced image 82 as illustrated in FIG. 16. Such compression may be realized by performing selective reduction of pixels of the original overall image signal 78 in longitudinal or vertical directions. The detailed image reducing unit 74 similarly performs compression of the original detailed image 80 through selective reduction in longitudinal or vertical directions to obtain a reduced detailed image 86 by the allotted ratio of B %. A composite image 86 of 100% is finally produced in the image compositing unit 76 by matching the reduced overall image 82 reduced to A % and the reduced detailed image 84 reduced to B % so as to output this composite image 86 to an external unit as composite image signal E8 upon reading the same at a suitable rate. The image signals corresponding to simultaneously obtained two frames, namely the overall image and the detailed image, can consequently be output to the external unit upon compression thereof into a composite image signal of a single frame, and the overall image and the detailed image that have been simultaneously obtained can be transmitted by using signal lines of a single system.

One example of a method for compositing images others than those of FIGS. 15 and 16 is the interlace method. In the interlace method, the overall image 78 and the detailed image 80 are respectively (selectively) reduced by ½ in longitudinal directions for transferring the reduced overall image in the former half of the time for transferring the images while the reduced detailed image is transferred in the latter half thereof. It is of course possible to make it the other way round and to transmit the detailed image in the former half while the overall image is transmitted in the latter half. Upon employing such a method of image composition, an overall image and a partial detailed image can simultaneously be transferred as a single image signal while the resolution either in the longitudinal or vertical direction is reduced.

As discussed so far, the present invention exhibits the following effects as will be listed hereinafter.

First, upon separating the incident condensed image into two through the spectroscope and picking up one condensed image by the overall image pickup unit for acquiring an overall image, an arbitrary part of the overall image can be simultaneously and rapidly picked up for the other condensed image as a detailed image of effectively improved resolution.

Second, since the resolutions for area pickup elements for picking up the overall image and partial detailed images can be realized through elements of relatively low resolution of, for instance, 512 by 512 pixels or 640 by 480 pixels as employed in normal NTSC video cameras, images can be rapidly output at output rates for the overall image and the detailed images being 30 frames/second (fPS) or more.

Third, by providing a plurality of area pickup elements in the detailed image pickup unit, an area pickup element that is closest to a part of the overall image that is to be picked up can be moved to the target position so that it is possible to reduce the amount of movements of the area pickup elements while also reducing the time for obtaining a detailed image of the arbitrary part.

Fourth, by utilizing the overall image for setting the position of the partial detailed image within the detailed image pickup unit, tracing and observation can be performed in which an object moving within the overall image is traced and continuously captured as detailed images.

Fifth, by comprising the spectroscopes and detailed image pickup units as a multi-staged arrangement, different resolution ratios of resolutions of different intensities can be set for the plurality of detailed image pickup units with respect to the overall image pickup unit to thus arbitrarily select a detailed image pickup unit having a resolution of desired intensity through control from an external unit and to obtain partial detailed images of suitable resolution.

Sixth, upon compositing an overall image and a partial detailed image obtained in the pickup device into a single image, an output of the pickup device may be treated as a single image signal.

Seventh, since an image of a condensed object is separated into two for obtaining an overall image and a partial detailed image, a pickup optical axis when seen from the entire pickup device of the present invention will be a common one and no plurality of optical axes will exist as in conventional cases in which overall images and detailed images are obtained by using a plurality of cameras. It will accordingly be possible to pickup detailed images in a continuously stable manner without being influenced by distances or positions of the object to be picked up in picking of detailed images.

It should be noted that the present invention is not to be limited to be above-described embodiments but may include suitable modifications without departing from the object and advantages thereof. The present invention is further not to be limited through numerical values as indicated in the above-described embodiments.

What is claimed is:

1. An image pickup device, comprising
a spectroscope which makes an optical image of an object to be picked up as condensed by a condensing lens system incident and which separates the same into two directions,
an overall image pickup portion which forms one optical image as separated by the spectroscope as an overall image of the object to be picked up on an image-forming surface disposed with a primary area pickup element as reduced in size through a primary image-forming lens system and which picks the overall image up by the primary area pickup element so as to output an overall image signal, and
a detailed image pickup portion which forms the other optical image as separated by the spectroscope as an image on an image-forming surface disposed with a secondary area pickup element having a resolution equivalent to the primary area pickup element as enlarged in size through a secondary image-forming lens system and which picks a part of the overall image up by the secondary area pickup element so as to output a detailed image signal of high resolution.

2. The device according to claim 1, wherein the primary image-forming lens system reduces the optical image from the spectroscope at a specified reduction scale α so as to form an image of the overall image of the object on the primary area pickup element,
wherein the secondary image-forming lens system enlarges light from the spectroscope at a specified enlargement scale β so as to form an image of the overall image of the object on a position of the image-forming surface on which the secondary area pickup element is disposed, and
wherein a resolution ratio for the detailed image that is to be of higher resolution with respect to the overall image is set on the basis of the reduction scale α, the enlargement scale β, and pickup sizes of the primary and secondary area pickup elements.

3. The device according to claim 2, wherein the resolution ratio K of the detailed image that is to be of higher resolution with respect to the overall image is set to satisfy $$K=(\beta/\alpha)\cdot\gamma$$

wherein γ is a size ratio (L1/L2) of a pickup size L1 of the primary area pickup element to a pickup size L2 of the secondary area pickup element L2.

4. The device according to claim 3, wherein the resolution ratio K of the detailed image that is to be of higher resolution with respect to the overall image is set to satisfy $$K=(\beta,\alpha)$$

in case the pickup sizes of the primary and secondary area pickup elements are identical.

5. The device according to claim 1, wherein the detailed image pickup unit is comprised with a moving unit which moves the secondary area pickup element to an arbitrary position of the overall image formed on the image-forming surface.

6. The device according to claim 5, wherein the moving unit is comprised with a position controlling unit which moves the secondary area pickup element to a target position within the overall image as instructed from an external unit.

7. The device according to claim 5, wherein the detailed image pickup unit is comprised with a position controlling unit in which a plurality of secondary area pickup elements are fixedly provided on the moving unit such that it selects and moves a secondary area pickup element that is closest to the target position within the overall image as instructed from an external unit.

8. The device according to claim 5, wherein the detailed image pickup unit is comprised with a position controlling unit which detects a specific moving body from the overall image signals that are output from the overall image pickup unit and which makes the secondary area pickup element track and move through the moving unit.

9. The device according to claim 1, wherein a plurality of groups of spectroscopes and detailed image pickup units are disposed in a multi-staged manner along an optical axis of the condensing lens system so as to make one optical image from a spectroscope of the last stage incident into the overall image pickup unit, wherein different resolution ratios with respect to the overall image are set such that the resolutions of the detailed image signals as output from the plurality of detailed image pickup units differ, and wherein a resolution selecting unit is provided which selects and outputs a detailed image signal having a corresponding resolution from among the plurality of detailed image pickup units through instructions for selecting a resolution from an external unit.

10. The device according to claim 9, wherein the plurality of spectroscopes perform separation of incident light such that amounts of light that are made incident into the plurality of detailed image pickup units and the overall image pickup unit are identical.

11. The device according to claim 1, further including an image compositing portion which compresses an overall image signal of a specified image size and which compresses a detailed image signal of identical specified image size such that it suits the image size that has become empty through the compression of the overall image signal, and which generates a composite image signal of the specified size upon combining the compressed overall image signal and the detailed image signal so as to output the same to the external unit.

* * * * *